United States Patent
Kita et al.

(10) Patent No.: US 12,545,583 B2
(45) Date of Patent: *Feb. 10, 2026

(54) PROCESS FOR THE REMOVAL OF HEAVY METALS FROM A PHOSPHORIC ACID CONTAINING COMPOSITION

(71) Applicant: Yara International ASA, Oslo (NO)

(72) Inventors: Patrycja Kita, Poznan (PL); Tom Rames Jørgensen, Porsgrunn (NO); Tanja Vojnovic, Skien (NO); Katrine Lie Bøyesen, Skien (NO)

(73) Assignee: YARA INTERNATIONAL ASA, Oslo (NO)

( * ) Notice: Subject to any disclaimer, the term of this patent is extended or adjusted under 35 U.S.C. 154(b) by 450 days.

This patent is subject to a terminal disclaimer.

(21) Appl. No.: 18/008,827

(22) PCT Filed: Jun. 16, 2021

(86) PCT No.: PCT/EP2021/066179
§ 371 (c)(1),
(2) Date: Dec. 7, 2022

(87) PCT Pub. No.: WO2021/255065
PCT Pub. Date: Dec. 23, 2021

(65) Prior Publication Data
US 2023/0219817 A1    Jul. 13, 2023

(30) Foreign Application Priority Data

Jun. 16, 2020  (EP) .................................. 20180341
Sep. 8, 2020   (EP) .................................. 20195118

(51) Int. Cl.
*C01B 25/238* (2006.01)
*B01D 21/01* (2006.01)
(Continued)

(52) U.S. Cl.
CPC ............ *C01B 25/238* (2013.01); *B01D 21/01* (2013.01); *C02F 1/26* (2013.01); *C02F 1/683* (2013.01);
(Continued)

(58) Field of Classification Search
None
See application file for complete search history.

(56) References Cited

U.S. PATENT DOCUMENTS 4,308,214 A   12/1981  Robertson
4,334,074 A    6/1982  Peterson
(Continued)

FOREIGN PATENT DOCUMENTS

CN    1036745    11/1989
CN    1109025     9/1995
(Continued)

OTHER PUBLICATIONS

Machine translation of WO-2014038537-A1, pp. 1-14. (Year: 2014).*
(Continued)

*Primary Examiner* — Clare M Perrin
(74) *Attorney, Agent, or Firm* — DILWORTH IP, LLC (57) ABSTRACT

Improved methods for the removal of heavy metals, in particular cadmium, from an aqueous phosphoric acid containing composition, using an organothiophosphorous heavy metal precipitating agent to said composition, wherein the reaction between the heavy metals, in particular cadmium, and the organothiophosphorous precipitating agent is performed at a pH ranging between 1.6 and 2.0 measured after a 13-fold dilution by volume. Advantageously, an ionic polymer, particularly a cationic and/or an anionic poly (meth)acrylamide copolymer may be used to promote heavy metal precipitation and/or to facilitate the removal of the precipitates from the composition. More in particular, the
(Continued)

---

ADJUSTMENT OF THE pH OF A PHOSPHORIC ACID CONTAINING COMPOSITION to pH 1.6-2.0 measured after a 13-fold dilution by volume ADDITION OF PRECIPITATING AGENT
(under vigorous mixing)

SEPARATION OF PRECIPITATE
FROM FILTRATE/SUPERNATANT phosphoric acid containing composition is obtained by the acid digestion of phosphate rock, preferably by nitric acid, sulfuric acid, or a combination thereof.

15 Claims, 3 Drawing Sheets

(51) Int. Cl.
| | |
|---|---|
| C02F 1/26 | (2023.01) |
| C02F 1/68 | (2023.01) |
| C02F 11/14 | (2019.01) |
| C22B 3/26 | (2006.01) |
| C22B 3/38 | (2006.01) |
| B03D 3/06 | (2006.01) |
| C02F 1/56 | (2023.01) |
| C02F 9/00 | (2023.01) |
| C02F 101/20 | (2006.01) |

(52) U.S. Cl.
CPC ............... *C02F 11/14* (2013.01); *C22B 3/26* (2021.05); *C22B 3/382* (2021.05); *B03D 3/06* (2013.01); *C02F 1/56* (2013.01); *C02F 9/00* (2013.01); *C02F 2101/20* (2013.01); *C02F 2209/06* (2013.01)

(56) References Cited

U.S. PATENT DOCUMENTS

| | | | |
|---|---|---|---|
| 4,378,340 A | 3/1983 | Berglund | |
| 4,437,997 A | 3/1984 | Dobry | |
| 4,479,924 A * | 10/1984 | von Plessen | C01G 21/003 |
| | | | 423/100 |
| 4,584,111 A | 4/1986 | Collett | |
| 4,634,580 A | 1/1987 | Jdid | |
| 4,762,693 A | 8/1988 | Schimmel | |
| 4,986,970 A * | 1/1991 | Haraldsen | C22B 17/04 |
| | | | 423/321.1 |
| 5,173,280 A | 12/1992 | Rey | |
| 5,378,262 A | 1/1995 | Mihaylov et al. | |
| 5,656,175 A | 8/1997 | Bossier | |
| 2004/0136889 A1 | 7/2004 | Bonath | |
| 2004/0179984 A1 | 9/2004 | Nagaraj | |
| 2012/0193296 A1 | 8/2012 | Bhaduri | |
| 2019/0106324 A1* | 4/2019 | Zhang | C01B 25/238 |

FOREIGN PATENT DOCUMENTS

| | | | | |
|---|---|---|---|---|
| CN | 1109913 A * | 10/1995 | ............. | C01G 53/01 |
| CN | 101560004 | 10/2009 | | |
| CN | 104478060 | 4/2015 | | |
| CN | 105944451 | 9/2016 | | |
| CN | 206624725 | 11/2017 | | |
| CN | 109205846 | 1/2019 | | |
| DE | 3209183 A1 | 9/1983 | | |
| DE | 3502215 | 7/1986 | | |
| EP | 0039119 | 11/1981 | | |
| EP | 0091043 | 10/1983 | | |
| FI | 830270 | 7/1983 | | |
| FR | 2870229 | 11/2005 | | |
| RU | 2386592 C2 | 4/2010 | | |
| WO | 8908075 | 9/1989 | | |
| WO | 2004083118 | 9/2004 | | |
| WO | 2011154991 | 12/2011 | | |
| WO | WO-2014038537 A1 * | 3/2014 | ............... | C02F 1/56 |
| WO | 2019071108 | 4/2019 | | |

OTHER PUBLICATIONS

Machine translation of CN-1109913-A, pp. 1-16. (Year: 1995).*
English translation of Chinese Office Action issued in App. No. CN202180028835, dated Sep. 8, 2023, 17 pages.
English Abstract of EP0085344 (A2), corresponding to FI 830270, Hoechst Ag.
International Preliminary Report on Patentability issued in App. No. PCT/EP2021/066179, mailing date Mar. 16, 2022, 14 pages.
International Search Report and Written Opinion issued in App. No. PCT/EP2021/066174, mailing date Oct. 13, 2021, 12 pages.
International Preliminary Report on Patentability issued in App. No. PCT/EP2021/066244, mailing date Apr. 8, 2022, 16 pages.
International Search Report and Written Opinion issued in App. No. PCT/EP2021/066244, mailing date Oct. 6, 2021, 13 pages.
International Search Report and Written Opinion issued in App. No. PCT/EP2021/066246, mailing date Oct. 6, 2021, 12 pages.
Swe Swe Mar & Masanori Okazaki, Microchemical Journal 104 (17-21), Sep. 2012.
Xu Zhaoxi, Heavy metal removal by wet phosphoric acid precipitation method, Inorganic Salt Industry, No. 02, Apr. 20, 1989, 4 pages.
He Zhiru, Li Ning, Research on wastewater treatment technology for storage battery production, Environmental Science and Management, No. 12, Dec. 15, 2011.
English translation of Chinese Office Action issued in App. No. CN202180028802, dated Sep. 8, 2023, 18 pages.
Chinese Office Action (including English translation) issued in App. No. CN202180028835, dated Jan. 13, 2024, 26 pages.
English translation of Chinese Office Action issued in App. No. CN202180028802, dated Jan. 11, 2024, 15 pages.
English translation of Chinese Office Action issued in App. No. CN202180034830, dated Jan. 17, 2024, 13 pages.
Office Action (including English translation) issued in App. No. EA20229299328, dated May 20, 2024, 10 pages.
Jing et al., "Port Environmental Pollution Control Technology", Ocean Press, Nov. 30, 2007, 4 pages.
Office Action and Search Report received for Chinese Application No. 202180034903, mailed on Feb. 15, 2025, 18 pages (8 pages of original office action and 10 pages of English Translation).

* cited by examiner

ADJUSTMENT OF THE pH OF A PHOSPHORIC ACID CONTAINING COMPOSITION to pH 1.6-2.0 measured after a 13-fold dilution by volume

ADDITION OF PRECIPITATING AGENT (under vigorous mixing)

SEPARATION OF PRECIPITATE

FROM FILTRATE/SUPERNATANT

FIG. 1

```
┌─────────────────────────────────────────────────────────────┐
│ ADJUSTMENT OF THE pH OF A PHOSPHORIC ACID CONTAINING        │
│                     COMPOSITION                             │
│  to pH 1.6-2.0 measured after a 13-fold dilution by volume  │
└─────────────────────────────────────────────────────────────┘
                              ⇩
┌─────────────────────────────────────────────────────────────┐
│             ADDITION OF FIRST FLOCCULATING AGENT            │
│                     (under gentle mixing)                   │
└─────────────────────────────────────────────────────────────┘
                              ⇩
┌─────────────────────────────────────────────────────────────┐
│              REMOVAL OF SLUDGE/INSOLUBLE FRACTION           │
└─────────────────────────────────────────────────────────────┘
                              ⇩
┌─────────────────────────────────────────────────────────────┐
│               ADDITION OF PRECIPITATING AGENT               │
│                    (under vigorous mixing)                  │
└─────────────────────────────────────────────────────────────┘
                              ⇩
┌─────────────────────────────────────────────────────────────┐
│                   SEPARATION OF PRECIPITATE                 │
│                  FROM FILTRATE/SUPERNATANT                  │
└─────────────────────────────────────────────────────────────┘
```

FIG. 2

ADJUSTMENT OF THE pH OF A PHOSPHORIC ACID CONTAINING COMPOSITION to pH 1.6-2.0 measured after a 13-fold dilution by volume

ADDITION OF FIRST FLOCCULATING AGENT (under gentle mixing)

REMOVAL OF SLUDGE/INSOLUBLE FRACTION (by settling and/or centrifugation)

ADDITION OF PRECIPITATING AGENT (under vigorous mixing)

ADDITION OF SECOND FLOCCULATING AGENT (under gentle mixing)

SEPARATION OF PRECIPITATE/AGGLOMERATE

FROM FILTRATE/SUPERNATANT

FIG. 3

PROCESS FOR THE REMOVAL OF HEAVY METALS FROM A PHOSPHORIC ACID CONTAINING COMPOSITION

FIELD

The present disclosure relates to the field of removing heavy metal ions, including but not limited to cadmium, from wet-process acidic compositions. More in particular, the present disclosure relates to removing heavy metal ions, such as cadmium, from phosphoric acid containing process streams.

BACKGROUND

Heavy metals such as cadmium, copper, nickel, lead, zinc and mercury are considered unacceptable above a certain level, depending on the application, because of their toxicity and they thus have to be either completely removed or their levels have to be reduced significantly. Many processes have been developed over the years for their removal.

In this context, the phosphate rock extracted from phosphate mines typically contains heavy metal impurities, such as cadmium, copper, arsenic, or mercury. For instance, cadmium typically is present at levels between 0.15 to 507 mg/kg of phosphate rock having an average phosphorous ($P_2O_5$) content of about 30 weight % (Swe Swe Mar & Masanori Okazaki, Microchemical Journal 104 (17-21), September 2012). Unless the heavy metals are removed from the phosphate rock prior to or during its digestion with acid, such as prior to or during the nitro-phosphate process, the resulting phosphate-based products and fertilizers will contain cadmium and other heavy metals. Some forms of heavy metals, such as cadmium, can be taken up by plants and, thereby, end up in the food chain. For instance, cadmium can cause damage to lungs, kidneys, and bones. Therefore, it is essential to limit the level of heavy metals, such as cadmium, in fertilizers. The European Union is now considering a limit of 60 mg cadmium per kilogram of phosphorous (expressed as $P_2O_5$). However, Finland is applying an even lower limit such as 21.5 mg of cadmium per kilogram of $P_2O_5$. The level of the heavy metal impurities thus has to be significantly reduced.

The precipitation of heavy metals, such as cadmium, in the nitro-phosphate process or in other processes comprising the acid digestion of phosphate rock, has previously been reported.

U.S. Pat. No. 4,378,340 discloses a method of removing heavy metals from an acid digest of phosphate rock by partial neutralization of the acids followed by precipitation of the heavy metals as sulphides. However, heavy metal (cadmium) precipitation as a sulphide compound benefits from a high pH, which will lead to unacceptable phosphor losses, as at higher pH values, both heavy metal sulphides and calcium phosphates precipitate.

U.S. Pat. No. 4,986,970 discloses a method for removal of heavy metals, especially cadmium, primarily from a mother liquor made by the Odda process, using metal salts of dithiocarbonic acid-O-esters, referred to as xanthates, at a pH ranging from 1.4 and 2.0 measured after a 13-fold dilution by volume, and at temperatures ranging from 5 to 40° C.

US2004/0179984A1 discloses a process and compositions to remove heavy metal ions, such as cadmium, copper, lead, nickel, arsenic, manganese, zinc, and mercury ions from the wet phosphoric acid process. The process involves treating phosphoric acid prior to or after gypsum filtration with diorgano-dithiophosphinic acid (or alkali metal or ammonia salts thereof), a first diorgano-dithiophosphoric acid (or alkali metal or ammonia salts thereof) and optionally a second diorgano-dithiophosphoric acid (or alkali metal or ammonia salts thereof), precipitating metals such as cadmium, copper, lead, nickel, arsenic, manganese, zinc and mercury at a temperature from about 10 to about 85° C. and preferably in the range of about 50 to about 80° C., and separating the filtrate by either filtration or flotation. In this context, the examples only indicate that these compounds are effective in phosphoric acid, in particular at temperatures ranging from 60 to 80° C.

EP0091043 discloses the use of similar heavy metal removal agents as disclosed in US20040179984 for the removal of cadmium by precipitation from the Odda process. In EP0091043, Cd precipitation is performed at a mother liquor pH range of 0.5-1.5 (of the undiluted composition) with a desired pH range of 0.6-1.2.

WO2019071108 discloses the simultaneous use of organothiophosphorous compounds and surfactants, such as sulfosuccinate compounds and polyethyleneglycol esters for removing heavy metal ions from aqueous solutions containing phosphoric acid, in particular in various stages of wet process phosphoric acid production.

Nevertheless, despite the various approaches of the prior art, the removal of heavy metals, such as cadmium, from a phosphate rock digest by concentrated acid, such as nitric acid, remains challenging due to the very acidic and oxidizing conditions in the phosphate rock digest or in the mother liquor, and the presence of calcium, which may affect heavy metal precipitation as well. For instance, during the neutralization of the phosphate rock digest or mother liquor, heavy metals, such as cadmium, precipitate along with calcium phosphates. Indeed, at a pH value above 4 or 5, different phosphate species precipitate as well, which lead to unwanted losses of the valuable phosphorous. In addition, heavy metal contamination, especially cadmium, remains a concern to public health. In this context, as indicated above, regulatory agencies continue to impose lower limits on the acceptable level of heavy metals, in particular cadmium. There thus remains a need for improved methods for the efficient removal of heavy metals, such as cadmium, from phosphoric acid containing compositions. In particular, there remains a need for improved methods for the efficient removal of heavy metals, such as cadmium, while also maintaining phosphorous in solution and minimizing phosphorous loss by precipitation.

SUMMARY

The present disclosure provides improved methods for the removal of heavy metals, in particular cadmium, from an aqueous phosphoric acid containing composition, which address the above identified needs in the art. The improved methods of the present disclosure provide heavy metal (Cd) precipitation conditions with high heavy metal (Cd) precipitation efficiency while keeping phosphorous in solution.

According to one aspect of the present disclosure, a method is disclosed for the removal of heavy metals from a phosphoric acid containing composition, comprising the steps of
  (a) providing a phosphoric acid containing composition comprising dissolved heavy metals, such as cadmium;
  (b) precipitating the dissolved heavy metals by adding a heavy metal precipitating agent to composition of step (a), thereby obtaining a heavy metal precipitate in a phosphoric acid containing composition, wherein the heavy metal precipitating agent comprises a diorganodithiophosphinic acid or an alkali metal or ammonia salt thereof, represented by Formula 1

Formula 1 wherein R is a linear or branched hydrocarbon group selected from alkyl, aryl, alkylaryl, or aralkyl, and wherein the hydrocarbon group contains 3 to 20 carbon atoms, and M is H, alkali metal or ammonia; and (c) separating the heavy metal precipitate from the phosphoric acid containing composition;

wherein the precipitating step (b) is performed at a pH of 1.6 to 2.0 (measured after a 13-fold dilution by volume). Advantageously, at these pH values, the heavy metal precipitation and extraction efficiency is very high and the loss of phosphor by precipitation of phosphor containing compounds is very limited.

According to an embodiment of the present disclosure, R in Formula 1 is selected from the group consisting of cyclohexyl, isopropyl, isobutyl, n-propyl, octyl, hexyl, phenylethyl and 2,4,4-trimethylpentyl, particularly wherein the heavy metal-precipitation agent is sodium diisobutyldithiophosphinate. Advantageously, precipitating agents according to Formula 1 have a good cadmium extraction efficacy and are less hazardous compared to inorganic sulphides and xanthates. In particular, precipitating agents according to Formula 1 result in lower (if any) $H_2S$, COS or $CS_2$ emissions compared to inorganic sulphides and xanthates.

According to an embodiment of the present disclosure, step (a) further comprises the steps of (i) adjusting the pH of a phosphoric acid containing composition comprising dissolved heavy metals to a pH of 1.6 to 2.0 measured after a 13-fold dilution by volume, thereby obtaining a neutralized phosphoric acid composition comprising a sludge fraction;

(ii) optionally adding a first flocculating agent to the composition of step (i);

(iii) separating the sludge fraction from the composition of step (i) or (ii).

Advantageously, removing the sludge fraction prior to step b) results in the addition of the heavy metal precipitating agent to an acid composition with a reduced amount of particles and/or sludge, thus facilitating the heavy metal precipitation and yielding a more concentrated heavy metal precipitate.

According to an embodiment of the present disclosure, the pH adjustment is performed by the addition of ammonia.

According to an embodiment of the present disclosure, step (b) comprises the steps of (b1) precipitating the dissolved heavy metals by adding the heavy metal precipitating agent to the composition of step (a), thereby obtaining a heavy metal precipitate in a phosphoric acid containing composition; and (b2) adding a second flocculating agent to the composition obtained in step (b1), thereby obtaining agglomerates comprising the heavy metal precipitate.

More in particular, the first and/or the second flocculating agent is an anionic polymer, a cationic polymer, or a mixture thereof. Advantageously, the flocculating agent promotes the formation of agglomerates of the heavy metal precipitates, thereby facilitating the separation of the heavy metal precipitates from the phosphoric acid containing composition.

According to an embodiment of the present disclosure, in step (b), an anionic polymeric surfactant, a cationic polymeric surfactant, or a mixture thereof is added in combination with the heavy metal precipitation agent to the composition of step (a). Advantageously, the ionic polymeric surfactant promotes the precipitation of the heavy metal by the heavy metal precipitating agent.

In particular, the ionic polymeric surfactant or flocculating agent is an ionic (meth)acrylamide copolymer. More in particular, the ionic polymeric surfactant or flocculating agent is
  a cationic copolymer of (meth)acrylamide, such as a cationic copolymer of (meth)acrylamide and a chloromethylated monomer,
  an anionic copolymer of (meth)acrylamide and (meth) acrylic acid, or
  a mixture thereof.

In certain embodiments of the present disclosure, either one or both of the surfactant or flocculating agent is added in a dose of 5 to 30 $g/m^3$ acid composition, particularly in a dose of 5 to 20 $g/m^3$ acid composition.

According to an embodiment of the present disclosure, the precipitation and/or flocculation steps are performed at a temperature of 10 to 50° C.

According to an embodiment of the present disclosure, the phosphoric acid containing composition is an acid digest of phosphate rock, preferably by nitric acid, sulfuric acid and/or a mixture thereof. More in particular, the phosphoric acid containing composition is an acidic aqueous composition comprising from 25 to 33 wt % phosphoric acid, from 6-21 wt % nitric acid, from 3.5 to 5 wt % calcium and dissolved heavy metals, such as cadmium, with wt % being based on the total weight of the composition.

According to an embodiment of the present disclosure, the heavy metals are selected from cadmium, copper, nickel, mercury, zinc, arsenic, manganese and/or lead; preferably the heavy metal is cadmium.

DETAILED DESCRIPTION

Before the present system and method of the invention are described, it is to be understood that this invention is not limited to particular systems and methods or combinations described, since such systems and methods and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any $\geq 3$, $\geq 4$, $\geq 5$, $\geq 6$ or $\geq 7$ etc. of said members, and up to all said members.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may be. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those ordinary skilled in the art. For example, in the appended claims, any of the claimed embodiments can be used in any combination.

In the present description of the invention, reference is made to the accompanying drawings that form a part hereof, and in which are shown by way of illustration only of specific embodiments in which the invention may be practiced. It is to be understood that other embodiments may be utilised and structural or logical changes may be made without departing from the scope of the present invention. The following detailed description, therefore, is not to be taken in a limiting sense, and the scope of the present invention is defined by the appended claims.

In the present disclosure, the concentration of the components comprised in a composition, when indicated as a percentage, is given by weight with respect to the total weight of the composition, unless otherwise stated.

In the present application, unless otherwise stated, the pH values are measured after a 13 fold dilution by volume with water. Stated differently, the pH value is measured after mixing one volume of a non-diluted sample with 13 volumes of water.

In the present disclosure, unless explicitly stated otherwise, the terms "ionic polymer" or "ionic polymeric" as they relate to the flocculating agent or surfactant considered herein, are in the meaning of macromolecules comprising multiple charged or ionic subunits. More specifically, the term "ionic polymer" or "ionic polymeric" as they relate to the flocculating agent or surfactant considered herein is used synonymously for the terms "polyelectrolyte" or "polyelectrolytic", i.e. polymers, in particular polycations or polyanions, whose repeating units bear an electrolyte group. In the present disclosure, ionic poly(meth)acrylamides, such as cationic or anionic poly(meth)acrylamides are particularly preferred.

The present disclosure provides improved methods for the removal of heavy metals, in particular cadmium, from an aqueous phosphoric acid containing composition, wherein a heavy metal precipitating agent is added to an aqueous phosphoric acid containing composition, at a pH of about 1.6 to about 2.0 measured after a 13-fold dilution by volume. As used herein, the term "heavy metal" generally refers to those elements of the periodic table having a density of more than 5 g/cm$^3$. Such heavy metal (or heavy metal ions) include, for example, one or more of cadmium, copper, nickel, mercury, zinc, arsenic, manganese and lead. The present disclosure is particularly directed for the removal of at least cadmium from compositions containing phosphoric acid. The term "phosphoric acid containing composition" may be any aqueous acidic solution or composition containing unrefined phosphoric acid, digestion slurries, filtered acid, and/or concentrated acid, as further discussed below.

According to one aspect of the present disclosure, a method is disclosed for the removal of heavy metals from a phosphoric acid containing composition, comprising the steps of

(a) providing a phosphoric acid containing composition comprising dissolved heavy metals, such as cadmium;

(b) precipitating the dissolved heavy metals by adding a heavy metal precipitating agent to composition of step (a), thereby obtaining a heavy metal precipitate in a phosphoric acid containing composition, wherein the heavy metal precipitating agent comprises a organodithiophosphorous acid, in particular a diorgano-dithiophosphinic acid or an alkali metal or ammonia salt thereof, and (c) separating the heavy metal precipitate from the phosphoric acid containing composition;

wherein the precipitating step (b) is performed at a pH of 1.6 to 2.0 (measured after a 13-fold dilution by volume using water). At these pH values, heavy metal precipitation, particularly cadmium precipitation, using an organothiophosphorous acid or an alkali metal or ammonia salt thereof, in particular a diorgano-dithiophosphinic acid or an alkali metal or ammonia salt thereof as envisaged herein is especially effective. In addition, at these pH conditions, precipitation of phosphorous salts, in particular dicalcium phosphate (CaHPO$_4$) is minimized, thereby minimizing phosphorous losses and maintaining the content of phosphorous in the phosphoric acid composition and, hence, in the final product.

In particular, the heavy metal is cadmium. In the context of the present disclosure, the organothiophosphorous heavy metal precipitating agent comprises a diorgano-dithiophosphinic acid or an alkali metal or ammonia salt thereof, represented by Formula 1

Formula 1 wherein R is a linear or branched hydrocarbon group selected from alkyl, aryl, alkylaryl, or aralkyl, and wherein the hydrocarbon group contains 3 to 20 carbon atoms, and M is H, alkali metal or ammonia. Preferred examples of the groups R in the diorgano dithiophosphinic acid (or alkali metal or ammonia salts thereof) according to formula 1 include, but are not limited to, hydrocarbons containing 3 to 20 carbon atoms in which the hydrocarbon group is linear or branched alkyl, cycloalkyl, alkylaryl, aralkyl. More preferably, suitable hydrocarbon groups include, but are not limited to, cyclohexyl, isopropyl, isobutyl, n-propyl, octyl, hexyl, phenylethyl, and 2,4,4-trimethyl pentyl. Even more preferably, the diorgano-dithiophosphinic acid (or salt thereof) used in the present invention as heavy metal precipitation agent is di-isobutyl dithiophosphinate. In a preferred embodiment, the precipitating agent is sodium di-isobutyl dithiophoshinate.

Generally, the heavy metal precipitating agent can be prepared according to the procedure described in U.S. Pat. No. 4,308,214 and the corresponding examples by heating 67.2 parts of sulfur 114.8 to 284.8 parts of water to a temperature of about 70° C. To the mixture are then steadily metered in 29.5 to 64.5 of the commercially available di-phosphine. After the di-phosphine has been metered, an additional 67.5 to 193.5 parts additional parts of diethyl phosphine are metered in at a rate such that within the time necessary to meter in all of the diethylphosphine, 80.0 parts of a 50% solution of sodium hydroxide are also metered in at a constant rate to neutralize the corresponding dithiophosphinic acid that forms.

In certain embodiments, the heavy metal precipitating agent is added in an amount ranging from 10 µg to 1 mg per g of the phosphoric acid containing composition, particularly from 50 µg to 0.75 mg per g of the phosphoric acid containing composition, more particularly ranging from 0.2 to 0.6 mg or from 0.3 mg to 0.6 mg per g of the phosphoric acid containing composition.

According to an embodiment of the present disclosure, the reaction with the heavy metal precipitating agent as envisaged herein may be performed for 3 minutes to 1.5 hour, for 5 minutes to one hour, or for 10 to 30 minutes. The skilled person understands that the reaction with the heavy metal precipitating agent as envisaged herein is particularly performed under vigorous mixing conditions, in particular at mixing speeds of 500 to 700 rpm. According to an embodiment of the present disclosure, the reaction with the heavy metal precipitating agent as envisaged herein may be performed at temperature ranging from 5° C. to 80° C., in particular at a temperature from 5° C. to 50° C., more particularly are performed at a temperature of 5° C. to 40° C. As the heavy metal precipitate may be less stable at temperatures above 40° C., it may be desirable to perform the reaction with the heavy metal precipitating agent for less than 10 minutes at higher temperatures. Stated differently, at temperatures of 40° C. to 50° C. or higher, step c) is preferably performed 3 to 10 min after step b) to prevent unwanted degradation of the precipitate at higher temperatures. Performing the precipitation at lower temperatures is beneficial for the stability of the precipitating agent, but may require more time for the precipitate to form.

In the context of the present disclosure, the phosphoric acid containing composition from which the heavy metals, in particular cadmium is to be removed, may be obtained by digesting a phosphate rock, a phosphate ore or a phosphate mineral with an acid. Such phosphate rock may contain high amounts of heavy metals, in particular cadmium, e.g. from 10 to 300 mg Cd/kg P$_2$O$_5$. The acid used in the digesting step may be nitric acid, sulfuric acid or a combination thereof.

In certain embodiments, the phosphoric acid containing composition comprises from 1 to 85 wt % phosphoric acid, particularly from 1 to 60 wt % phosphoric acid, more particularly from 10 to 60 wt %, such as from 20 to 60 wt % phosphoric acid, even more particularly from 10 to 40 wt % phosphoric acid, most particularly from 20 to 35 wt % or from 25 to 30 wt % phosphoric acid and dissolved heavy metals, such as cadmium. The phosphoric acid containing composition may comprise from 1 to 500 mg/l, more in particular from 1 to 250 mg/l, more in particular 1 to 100 mg/l dissolved cadmium.

In certain embodiments, the phosphoric acid containing composition is obtained by digesting a phosphate rock, a phosphate ore or a phosphate mineral with nitric acid at 65° C. In particular, the phosphoric acid containing composition comprises from 18 to 21 weight % nitric acid, from 25 to 29 weight % phosphoric acid and dissolved heavy metals, such as dissolved cadmium. More in particular, the phosphoric acid containing composition is obtained by the nitrophosphate process. More in particular, the phosphoric acid containing composition is the mother liquor obtained in the nitrophosphate process. In the nitrophosphate process, in a first step or digestion step, phosphate rock is digested in nitric acid at a temperature of 65° C., yielding a digestion liquor. In a second step or crystallization step, calcium nitrate tetrahydrate is crystallized out of the digestion liquor yielding a crystal slurry. In a third step or separation step, the crystallized calcium nitrate is separated by a technique such as filtration or centrifugation, resulting in calcium nitrate tetrahydrate crystals being separated from the liquid of the crystal slurry, referred to as the mother liquor.

In certain embodiments, the phosphoric acid containing composition is obtained by a mixed acid process, wherein nitric acid is used for acidulation of a phosphate rock, a phosphate ore or a phosphate mineral. Sulfuric acid is typically added to precipitate the calcium as calcium sulphate (gypsum), which is generally left in the slurry and acts as a diluent. Phosphoric acid may be added in order to adjust the water soluble phosphorous, depending on the grade being produced.

Figure 1:
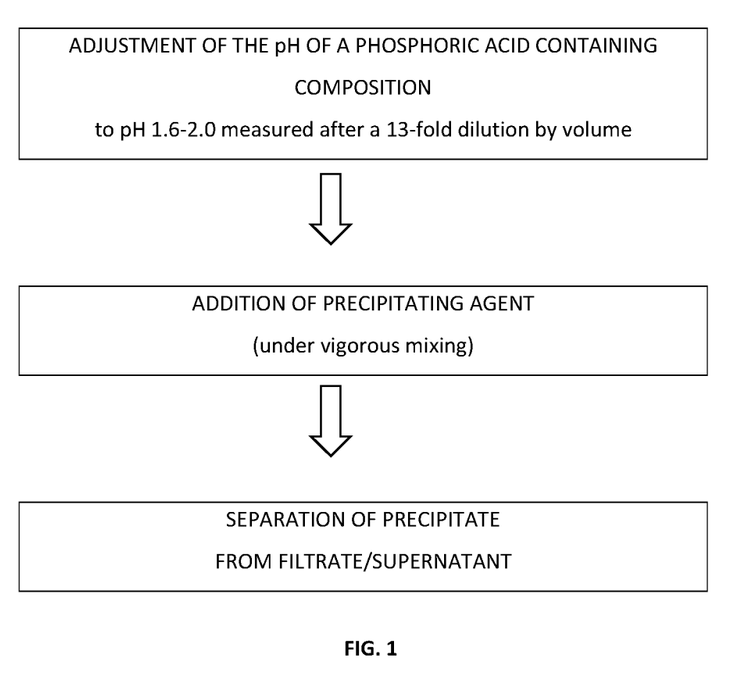
FIG. 1 schematically represents a particular embodiment of the method according to the present disclosure, comprising the steps, in sequence, of neutralizing a phosphoric acid composition to a pH 1.6-2.0 measured after a 13-fold dilution by volume, adding a precipitating agent, and separating the precipitate from the filtrate/supernatant.
Figure 2:
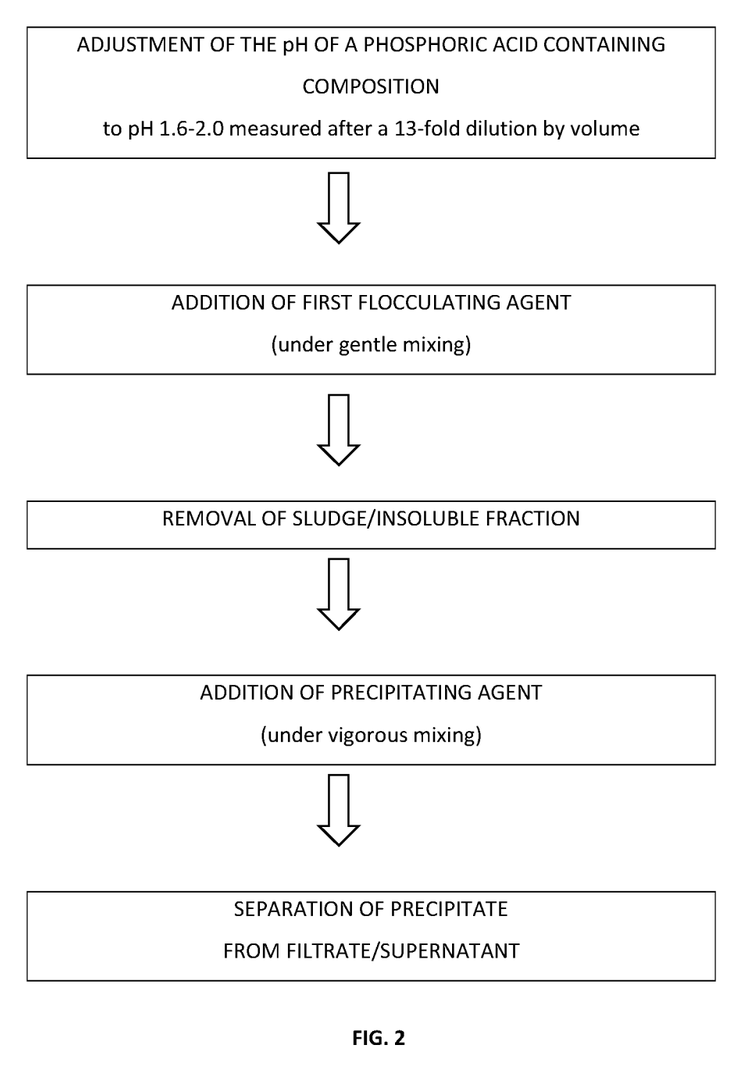
FIG. 2 schematically represents a particular embodiment of the method according to the present disclosure, comprising the steps, in sequence, of neutralizing a phosphoric acid composition to a pH 1.6-2.0 measured after a 13-fold dilution by volume, adding a first flocculating agent and removing a sludge fraction, adding a precipitating agent, and separating the precipitate from the filtrate/supernatant.
Figure 3:
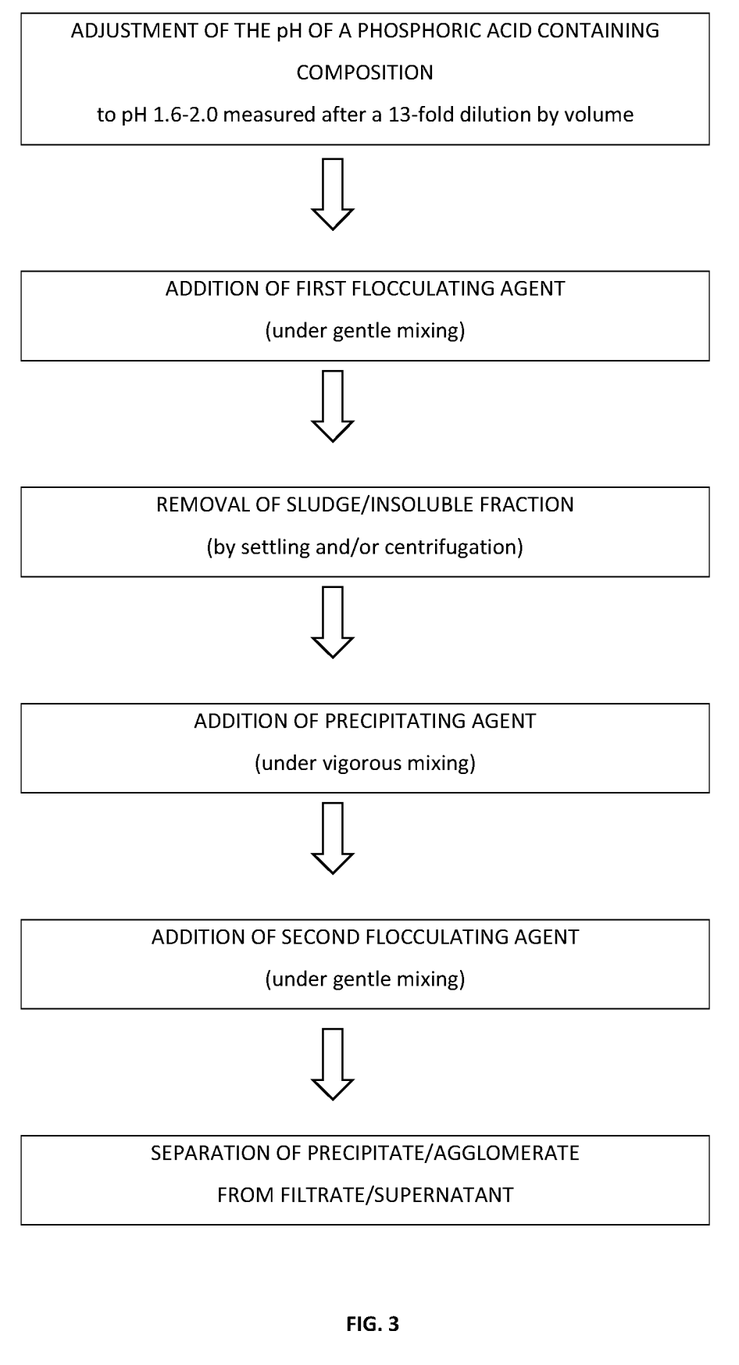
FIG. 3 schematically represents a particular embodiment of the method according to the present disclosure, comprising the steps, in sequence, of neutralizing a phosphoric acid composition to a pH 1.6-2.0 measured after a 13-fold dilution by volume, adding a first flocculating agent, removing a sludge fraction, adding a precipitating agent, adding a second flocculating agent and separating the precipitate from the filtrate/supernatant.

In certain embodiments, the phosphoric acid containing composition may be subjected to one or more pretreatments, prior to the addition of the precipitating agent, as indicated in FIG. 1, FIG. 2 and FIG. 3. Such pretreatments include pH adjustment (FIG. 1-FIG. 3) and/or separating an insoluble fraction (sludge) (FIG. 2 and FIG. 3) from the phosphoric acid containing composition.

In certain embodiments, removal of the insoluble fraction (sludge) may comprise the addition of a first flocculating agent to the neutralized phosphoric acid containing composition to facilitate the separation of the insoluble fraction from the phosphoric acid containing composition (FIGS. 2 and 3).

In particular, according to an embodiment of the present disclosure, step (a) further comprises the steps of
(i) adjusting the pH of a phosphoric acid containing composition comprising dissolved heavy metals to a pH of 1.6-2.0 (measured after a 13-fold dilution by volume using water), thereby obtaining a phosphoric acid containing composition comprising a sludge fraction;
(ii) optionally adding a first flocculating agent to the composition of step (i);
(iii) separating the sludge fraction from the composition of step (i) or (ii).

In the context of present disclosure, the pH of the phosphoric acid containing composition is adjusted prior to the addition of the heavy metal precipitating agent to a pH ranging between 1.6 and 2.0 (measured after a 13-fold dilution by volume using water), thereby obtaining a so-called neutralized phosphoric acid containing composition, having a higher pH value that the pH value for the phosphoric acid containing composition before the pH adjusting step (i). In certain embodiments, the pH of the aqueous phosphoric acid containing composition is adjusted using gaseous ammonia. Advantageously, particularly when the phosphoric acid containing composition comprises nitric acid, no other chemical elements are introduced other than nitrogen and hydrogen already present in the nitric acid, such that a very pure NP-end product may be obtained.

As defined herein, a first flocculating agent is a compound that is added before step a-(ii). In certain embodiments, at least part of the insoluble components or sludge present in the phosphoric acid containing composition, particularly the neutralized phosphoric acid containing composition, may be removed prior to the addition of the heavy metal precipitating agent. More in particular, a first flocculating agent may be added to the phosphoric acid containing composition, particularly the neutralized phosphoric acid containing composition, to promote the agglomeration and precipitation of the insoluble components or sludge fraction (FIGS. 2 and 3). Surprisingly, the removal of insoluble components or sludge before the addition of the heavy metal precipitating agent did not affect the heavy metal precipitation efficiency of the method. Moreover, the separation of part of the sludge and insoluble components, such as aided by flocculation, prior to heavy metal precipitation, in particular cadmium precipitation, facilitates the cadmium extraction from the composition comprising phosphoric acid. Advantageously, in this way, a smaller amount of the heavy metal precipitating agent as envisaged herein may be added to the phosphoric acid containing composition and the resulting heavy metal containing precipitates comprise a higher concentration of heavy metals, in particular cadmium.

The first flocculating agent may be any flocculating agent suitable for the agglomeration and flocculation of the sludge fraction.

The separation of the sludge may be accomplished by any standard technology for separation such as, but not limited to, filtration, centrifugation, sedimentation, flotation or decantation. In certain embodiments, the separation of the precipitated insoluble or sludge fraction due to the addition of the first flocculating agent is performed by centrifugation. In particular embodiments, the precipitated insoluble or sludge fraction is subject to a pre-concentration step prior to centrifugation, wherein at least part of the liquid is separated from the precipitated sludge fraction. For instance, such pre-concentration step may be a settling step, wherein the sludge agglomerates settle, so that the liquid can be separated, such as by decantation, prior to centrifugation. Advantageously, this way, the amount of the composition to be centrifuged, particularly the amount of liquid, is reduced and the centrifugation step is rendered more efficient, as the solids/liquid separation in the centrifugation is more easily achieved.

According to an embodiment of the present disclosure, heavy metal precipitation is promoted by the addition of a second flocculating agent, particularly an ionic polymeric flocculating agent, to the composition comprising heavy metal precipitates (FIG. 3). Stated differently, the second flocculating agent is added after the addition of the heavy metal precipitating agent and after heavy metal precipitates have been formed. According to an embodiment of the present disclosure, step (b) comprises the steps of
(b1) precipitating the dissolved heavy metals by adding the heavy metal precipitating agent to the composition of step (a), thereby obtaining a heavy metal precipitate in a phosphoric acid containing composition; and
(b2) adding a second flocculating agent to the composition obtained in step (b1), thereby obtaining agglomerates comprising the heavy metal precipitate.

As defined herein, a second flocculating agent is a compound that is added after the heavy metal precipitating agent is added to the composition in step b) and during the separating step c).

The flocculating agent induced formation of larger agglomerates promotes the separation of the precipitates comprising the heavy metal (cadmium) complexed with the heavy metal precipitation agent, from the aqueous phosphoric acid containing composition. The skilled person understands that the flocculating agent induced agglomerate formation is best performed under gentle mixing conditions, in particular at mixing speeds of 100 rpm to 300 rpm. This way, sufficient shear forces are applied to build agglomerates by collision of the metal precipitates and ionic charge attraction. Too high shear forces may overcome ionic charge attraction and thus not allow agglomeration. In certain embodiments, the flocculation step c) is performed at the same temperature and pH conditions as the precipitation step b).

Additionally or alternatively, heavy metal precipitation may be promoted by the addition of an ionic polymeric surfactant, which is added together with the di-organo dithiophosphinic acid according to formula 1, or an alkali metal or ammonia salt thereof as heavy metal precipitating agent. As defined herein, a surfactant is a compound that is added together with the heavy metal precipitating agent. Accordingly, in certain embodiments of the present disclosure, step (b) comprises the step of precipitating the dissolved heavy metals by adding a heavy metal precipitating agent together with a ionic polymeric surfactant as envisaged herein, particularly a cationic polymeric surfactant, an anionic polymeric surfactant, or a mixture thereof, to the composition of step (a), at a pH between 1.6 and 2.0 (measured after a 13-fold dilution by volume using water), thereby obtaining a heavy metal precipitate in a phosphoric acid containing composition, wherein the heavy metal precipitating agent comprises an diorgano-dithiophosphinic acid according to Formula 1 as envisaged herein, or an alkali metal or ammonia salt thereof.

More in particular, either one or both of the second flocculating agent and the surfactant is a cationic polymer, an anionic polymer or a mixture thereof.

In particular embodiments, either one or both of the second flocculating agent and the surfactant is a cationic polymer, an anionic polymer or a mixture thereof, wherein either one or both of the cationic and the anionic polymer has an ionic charge ranging from 10% to 80%, i.e. wherein 10% to 80% of the moieties or subunits making up the polymer are ionic or charged moieties or subunits. For anionic or cationic polymeric flocculating agents or surfactants considered herein, the ionic charge value may also be referred to as the degree of anionicity or the degree of cationicity, respectively. In certain embodiments, either one or both of the second flocculating agent and the surfactant is an ionic acrylamide copolymer or an ionic methacrylamide copolymer. As used herein, the term "ionic acrylamide copolymer", "ionic polyacrylamide", "ionic methacrylamide copolymer" or "ionic polymethacrylamide" refers to a polymer comprising acrylamide or methacryl amide subunits and additionally comprising subunits comprising an ionic charge. Cationic acrylamide copolymers or cationic methacrylamide copolymers comprise subunits having a cationic charge, particularly comprising a quaternary nitrogen atom, such as comprising ADAM or MADAM subunits, i.e. dimethylaminoethyl acrylate or dimethylaminoethel metacrylate, respectively. Anionic acrylamide copolymers or anionic methacrylamide copolymers comprise subunits having an anionic charge, particularly comprising a carboxylate or sulphonate functional group, such as comprising acrylic acid or methacrylic acid subunits, or styrene sulphonate subunits.

In certain embodiments, either one or both of the second flocculating agent and the surfactant is:
- a cationic polymer, particularly a cationic (meth)acrylamide copolymer, with a cationic charge ranging from 10% to 80%, particularly ranging from 20% to 60% or from 20% to 50%, more particularly ranging from 30% to 50% or from 35% to 45%;
- an anionic polymer, particularly an anionic (meth)acrylamide copolymer, with an anionic charge ranging from 10% to 50%, particularly ranging from 10% to 40%, more particularly ranging from 15% to 30%; or
- a mixture thereof.

A particularly preferred cationic flocculating agent or surfactant is a copolymer of acrylamide or methacrylamide monomers and a chloro-methylated monomer, such as dimethylaminoethyl methacrylate or dimethylaminoethyl acrylate monomers. A particularly preferred anionic flocculating agent is a copolymer of acrylamide or methacrylamide monomers and acrylic acid or methacrylic acid monomers.

In certain embodiments, the second polymeric flocculating agent or surfactant has a MW ranging from $3 \times 10^6$ Dalton to $14 \times 10^6$ Dalton, particularly from $4 \times 10^6$ Dalton to $12 \times 10^6$ Dalton, more particularly from $4 \times 10^6$ Dalton to $8 \times 10^6$ Dalton. The polymeric flocculating agent or surfactant may be a linear molecule or a branched molecule.

In certain embodiments, either one or all of the first flocculating agent, the second flocculating agent and the surfactant is added in a dose of 3 to 30 $g/m^3$ acid composition, particularly in a dose of 3 to 20 $g/m^3$ acid composition, such as in a dose of 5 to 20 $g/m^3$ or 10 to 20 $g/m^3$ acid composition.

In certain embodiments, the first flocculating agent may be the same or different than the second flocculating agent. In particular embodiments, the first flocculating agent is a cationic polymer, an anionic polymer or a mixture thereof. More in particular, the first flocculating agent is a cationic polymer, an anionic polymer or a mixture thereof, wherein the cationic and/or anionic polymer has an ionic charge ranging from 10% to 80%, i.e. wherein 10% to 80% of the moieties making up the polymer are ionic or charged moieties. The first flocculating agent may be a cationic polymer with a cationic charge ranging from 20% to 80%, particularly ranging from 20% to 60% or from 20% to 50%, more particularly ranging from 30% to 50% or from 35% to 45%; an anionic polymer with an ionic charge ranging from 10% to 50%, particularly ranging from 10% to 40%, more particularly ranging from 15% to 30%; or a mixture thereof. In particular embodiments, the first flocculating agent is an ionic copolymer of acrylamide or methacrylamide.

Accordingly, in particular embodiments, a method is provided for the removal of heavy metals dissolved in a phosphoric acid containing composition, wherein the method comprises the steps of
- (a)(i) providing a phosphoric acid containing composition comprising dissolved heavy metals, such as cadmium, and adjusting the pH of a phosphoric acid containing composition comprising dissolved heavy metals to a pH between 1.6 to 2.0 (measured after a 13-fold dilution by volume using water), thereby obtaining a neutralized phosphoric acid containing composition comprising a sludge fraction;
- (a)(ii) adding a first flocculating agent, particularly an ionic polymeric flocculating agent as envisaged herein to the composition of step (a)(i), thereby obtaining sludge agglomerates, and, optionally, removing part of a liquid fraction;
- (a)(iii) removing the sludge agglomerates from the composition of step (a)(ii), particularly by centrifugation;
- (b1) precipitating the dissolved heavy metals by adding the heavy metal precipitating agent to the composition of step (a)(iii), thereby obtaining a heavy metal precipitate in a phosphoric acid containing composition;
- (b2) adding a second flocculating agent, particularly an ionic polymeric flocculating agent as envisaged herein to the composition obtained in step (b1), thereby obtaining agglomerates comprising the heavy metal precipitate; and/or adding an ionic polymeric surfactant as envisaged herein concurrently together with the heavy metal precipitating agent in step (b1).
- (c) separating the heavy metal precipitate from the phosphoric acid containing composition of step (b2), particularly by centrifugation.

According to an embodiment of the present disclosure, either one or both of the precipitation step (b) and the flocculation step (a)(ii) are performed at a temperature of 5° C. to 50° C., particularly are performed at a temperature of 5° C. to 40° C. Particular good results were obtained at a temperature ranging from 10° C. to 35° C. or 10 to 30° C. These temperatures in combination with the above indicated pH conditions of 1.6 to 2.0 measured after a 13-fold dilution by volume, benefit the stability of the heavy metal precipitating agent in the phosphoric acid containing composition as envisaged herein. These conditions were also found to be optimal for flocculation and precipitation of the non-phosphate insoluble or sludge fraction in the (neutralized) phosphoric acid containing composition. Certain embodiments of the present disclosure include adjusting the temperature of the phosphoric acid containing composition to a temperature of 5° C. to 50° C., particularly to a temperature of 5° C. to 40° C., more particularly to a temperature of 10° C. to 35° C. or 10° C. to 30° C., by natural cooling or by heat exchangers.

In the context of the present disclosure, the separation in step c) or step a)(iii) may be accomplished by state of the art technology for liquid-solid separation such as, but not limited to, either one or both of centrifugation and decantation. Separation by centrifugation is particularly preferred. Although some of the agglomerates have been found to be quite fragile, separation of the flocculants by centrifugation was surprisingly effective.

Another aspect of the present disclosure provides a method for preparing a fertilizer, particularly a nitrogen fertilizer, comprising the steps of
  Digesting phosphate rock with nitric acid, thereby obtaining a composition comprising phosphoric acid and calcium nitrate;
  Removing heavy metals from the composition comprising phosphoric acid according to any embodiment of the methods envisaged herein; in particular comprising the steps of optionally removing a sludge fraction by flocculation with a (first) flocculating agent and precipitation; precipitating the dissolved heavy metals, such as cadmium, by adding a heavy metal precipitating agent to the phosphoric acid containing composition, at a pH of 1.6 to 2.0 (measured after a 13-fold dilution by volume using water) wherein the heavy metal precipitating agent comprises a diorgano-dithiophosphinic acid according to formula 1 or an alkali metal or ammonia salt thereof; subsequently adding a first flocculating agent to the composition comprising heavy metal precipitates, particularly under gentle mixing conditions, such as at mixing speeds of 100 to 300 rpm, thereby obtaining agglomerates comprising the heavy metal precipitate in a phosphoric acid containing composition; and separating the agglomerates comprising the heavy metal precipitate from the phosphoric acid containing composition.
  Further adjusting the pH of the phosphoric acid containing composition to approximately pH 5.8 (measured after a 13-fold dilution by volume using water) using gaseous ammonia;
  optionally, adding potassium salts to the phosphoric acid containing composition with pH 5.8 (measured after a 13-fold dilution by volume using water);
  particulating the phosphoric acid containing composition with pH 5.8 and optionally comprising potassium salts, and, further, optionally, coating and/or coloring the particles.

In this manner, it is possible to obtain, from the nitrophosphate process, coated or non-coated, colored on non-colored NP or NPK particles with reduced amounts of heavy metals, such as cadmium. It will be evident to the person skilled in the art that the method of the disclosure can be applied on the total aqueous composition resulting from the digestion step or only on part of the digestion liquor. In the latter case, the part of the digestion liquor which is not treated according to a method of the present disclosure is mixed with or diluted with the part of the digestion liquor which has been treated according to a method of the present disclosure, such that the heavy metal (cadmium) levels of the combined composition is below a desired value, particularly remains within the regulatory limits.

EXAMPLES

Example 1—Heavy Metal Precipitation at Different pH Values

Experimental Setup

Mother liquor obtained from the Odda process based on 100% uncalcined Khourigba 20 (K20) rock was neutralised to different pH values (pH 1.1-2.4), measured after a 13-fold dilution by volume using water (by mixing 1 part mother liquor and 13 parts water), to study the effect of pH on the Cd-extraction efficiency and potential phosphorous precipitation occurring during neutralisation. The pH range of 1.1-2.4 (measured after a 13-fold dilution by volume using water) corresponds to a pH range for the undiluted composition ranging of pH −0.95 to 0.68 (negative pH values may be measured in very acidic solutions). pH measurements were performed at room temperature (22-24° C.). All the tests were performed in laboratory scale (150-250 g).

The used mother liquor comprised 4.8 wt % Ca (as measured by Atomic Absorption Spectroscopy), 8.1 wt % P (as measured by gravimetry P), 34 wt % $H_2O$ (as measured by Karl Fisher titration) and 8.5 ppm Cd (as measured by ICP-OES). It is understood that the percentages and amounts as they relate to the ML composition are merely an indication of such composition and are not limiting for the process considered herein.

After neutralization to the desired pH (ranging from pH 1.1-2.4, measured after a 13-fold dilution by volume using water), the neutralized mother liquor was cooled to approximately 50° C. and centrifuged. The thus separated sludge was discarded.

Cd precipitation was performed with sodium diisiobutyl dithiophosphinate (DTPINa) as precipitating agent at not more than 30° C. to avoid degradation of the precipitating agent in the acidic media. In particular, to the supernatant was added DTPINa (0.016 g/g mother liquor 3.56%-corresponding to 570 ppm DTPINa) under intense mixing using a magnetic stirrer (600 rpm) for 3 min, then a cationic polyacrylamide flocculating agent was added (FO 4490 SSH, 0.1 wt % concentration, 0.003 g/g NP.-liq.), and, after addition of the flocculating agent, the stirring speed was reduced to 150 rpm for the flocculation step. After 3 min the suspension was centrifuged. The sludge and supernatant were analysed using ICP-OES (Thermo Scientific, iCAP 7400 Duo, in an axial mode for the heavy metals: Cd, Zn, Cu, Ni, Pb, Mn and As) for the heavy metal concentration and gravimetric P to assess the potential P-loss during the different steps.

Results

The concentration and total amount of Cd in the neutralized mother liquor (before and after sludge removal) and in the supernatant/filtrate after Cd precipitation is shown in Table 1.

TABLE 1

Cd precipitation efficiency at different pH values

| pH[a] | Cd in ML after neutralization (in mg) | Cd in ML after sludge removal (in mg) | Cd in supernatant after Cd precipitation (in mg) | Cd removal efficiency (%) |
|---|---|---|---|---|
| 1.1 (−0.95) | 1.6 | 1.4 | 1.3 | 7.2% |
| 1.3 (−0.69) | 1.6 | 1.4 | 1.3 | 5.6% |
| 1.4 (−0.53) | 1.8 | 1.6 | 1.5 | 7.6% |
| 1.5 (−0.27) | 1.7 | 1.5 | 1.4 | 8.9% |
| 1.6 (−0.1) | 1.5 | 1.3 | 0.06 | 96.6% |
| 1.8 (0.18) | 1.8 | 1.6 | 0.07 | 96.3% |
| 1.9 (0.27) | 1.6 | 1.4 | 0.04 | 97.7% |
| 2.0 (0.31) | 1.7 | 1.4 | 0.07 | 96.2% |
| 2.2 (0.68) | 2.6 | 2.3 | 0.2 | 89.2% |

[a]measured after a 13-fold dilution by volume using water; the values between brackets correspond to the pH of the undiluted sample.

These results show that sludge fraction contains very little Cd: the amount of Cd in the sample before sludge removal is similar to the amount Cd remaining in solution after sludge removal. Indeed, the sludge fraction merely consists of acid insoluble components which typically follows the liquor throughout the different process steps.

Table 1 further shows that the efficiency of the Cd extraction (by precipitation) depends on the pH. Below pH 1.6 (measured after a 13-fold dilution by volume using water), only about 7-9% of the Cd was precipitated by the DTPINa compound. In contrast, at pH values above pH 1.6 (measured after a 13-fold dilution by volume using water), the Cd removal efficiency increased to about 96%. At pH 2.2 (measured after a 13-fold dilution by volume using water), the Cd removal is still very high (ca. 90%). However, the separation step becomes the limiting factor, as the increasing viscosity renders the separation by centrifugation less efficient.

In addition, under the conditions of the present experimental setup, neutralizing the mother liquor to a pH of 2.4 (measured after a 13-fold dilution by volume using water), the liquor became solid upon cooling and no Cd precipitation by DTPINa could be performed.

Furthermore, as demonstrated in Table 2, at pH values between 1.1 and 2.0 (measured after a 13-fold dilution by volume using water), about 90-95% of the phosphorous present in the samples after sludge removal, remains in solution upon addition of the heavy metal precipitating agent, with about 5-10% of the P being lost in the Cd containing precipitate (waste). However, at pH 2.2 (measured after a 13-fold dilution by volume using water), only about ⅔ of the phosphorous present in the samples after sludge removal remains in the supernatant, after removal of the heavy metal (Cd) precipitates, indicating significant phosphorous losses in the precipitated fraction. Stated differently, at pH values above 2.0 (measured after a 13-fold dilution by volume using water), such as at pH 2.2 (measured after a 13-fold dilution by volume using water), phosphorous compounds (e.g. calcium phosphates) start to precipitate as a result of the elevated pH. Minimizing the loss of P in the process is important as phosphorous is a valuable component in the mother liquor.

TABLE 2

P recovery (by gravimetric P analysis) at different pH values

| pH[a] | P in supernatant after Cd precipitation (in g) | P in Cd precipitate (waste) (in g) | P in supernatant (% total P) |
|---|---|---|---|
| 1.1 (−0.95) | 8.60 | 0.80 | 91.5% |
| 1.3 (−0.69) | 11.61 | 0.63 | 94.9% |
| 1.4 (−0.53) | 13.87 | 0.90 | 93.9% |
| 1.5 (−0.27) | 13.43 | 1.11 | 92.4% |
| 1.6 (−0.1) | 11.28 | 0.75 | 93.8% |
| 1.8 (0.18) | 13.59 | 1.35 | 91.0% |
| 1.9 (0.27) | 11.91 | 0.92 | 92.8% |
| 2.0 (0.31) | 11.99 | 1.26 | 90.5% |
| 2.2 (0.68) | 14.87 | 7.87 | 65.4% |

[a]measured after a 13-fold dilution by volume using water; the values between brackets correspond to the pH of the undiluted sample.

In conclusion, below pH 1.6 (measured after a 13-fold dilution by volume using water), the Cd extraction (by precipitation) was negligible (about 7-9%), whereas at pH values ranging from 1.6-2.0 (measured after a 13-fold dilution by volume using water), the Cd extraction efficiency was about 96%. Advantageously, at pH values ranging from 1.6 to 2.0 (measured after a 13-fold dilution by volume using water), P losses in the heavy metal precipitate were minimized as well (about 5-10%). At pH 2.2 (measured after a 13-fold dilution by volume using water) and above, Cd extraction was still high, but viscosity issues affected the efficient separation of the Cd waste. In addition, more P was lost in the Cd waste as well due to P precipitation.

The invention claimed is:

1. A process for the removal of heavy metals from a phosphoric acid containing composition, comprising the steps of
(a) providing a phosphoric acid containing composition comprising dissolved heavy metals;
(b) precipitating the dissolved heavy metals by adding a heavy metal precipitating agent to the composition of step (a), thereby obtaining a heavy metal precipitate in a phosphoric acid containing composition, wherein the heavy metal precipitating agent comprises a diorganodithiophosphinic acid or an alkali metal or ammonia salt thereof, represented by Formula 1:

Formula 1 wherein R is a linear or branched hydrocarbon group selected from alkyl, aryl, alkylaryl, or aralkyl, and wherein the hydrocarbon group contains 3 to 20 carbon atoms, and M is H, alkali metal or ammonia; and
(c) separating the heavy metal precipitate from the phosphoric acid containing composition;
wherein the precipitating step (b) is performed at a pH of 1.6 to 2.0 (measured after a 13-fold dilution), wherein step (b) comprises the steps of:
(b1) precipitating the dissolved heavy metals by adding the heavy metal precipitating agent to the composition of step (a), thereby obtaining a heavy metal precipitate in a phosphoric acid containing composition; and (b2) adding a second flocculating agent to the composition obtained in step (b1), thereby obtaining agglomerates comprising the heavy metal precipitate, wherein said second flocculating agent is an anionic polymer, a cationic polymer or a mixture thereof that is suitable for the agglomeration and flocculation of the composition obtained in step (b1), and wherein the heavy metals are selected from cadmium, mercury, zinc, arsenic, manganese and/or lead.

2. The process according to claim 1, wherein step (a) further comprises the steps of
(i) adjusting the pH of a phosphoric acid containing composition comprising dissolved heavy metals to a pH of 1.6 to 2.0 measured after a 13-fold dilution by volume, thereby obtaining a phosphoric acid composition comprising a sludge fraction;
(ii) optionally adding a first flocculating agent to the composition of step (i) wherein said first flocculating agent is an anionic polymer, a cationic polymer, or a mixture thereof that is suitable for the agglomeration and flocculation of the sludge fraction; and
(iii) separating the sludge fraction from the composition of step (i) or (ii).

3. The process according to claim 2, wherein the pH adjustment is performed by the addition of ammonia.

4. The process according to claim 2, wherein, in step (b), an anionic polymeric surfactant, a cationic polymeric surfactant, or a mixture thereof is added in combination with the heavy metal precipitation agent to the composition of step (a), and wherein either one or both of the polymeric surfactant and the first flocculating agent is a copolymer of (meth) acrylamide and a chloro-methylated monomer, an anionic copolymer of (meth) acrylamide and (meth) acrylic acid, or a mixture thereof.

5. The process according to claim 4, wherein either one or both of the polymeric surfactant and the first flocculating agent is added in a dose of 3 to 30 g/m$^3$ acid composition.

6. The process of claim 5, wherein the dose is 3 to 20 g/m$^3$ acid composition.

7. The process according to claim 4, wherein either one or both of the precipitation and the flocculation steps are performed at a temperature of 10 to 50° C.

8. The process of claim 4, wherein the copolymer of (meth) acrylamide is a cationic copolymer of (meth) acrylamide.

9. The process according to claim 1, wherein the phosphoric acid containing composition is an acid digest of phosphate rock.

10. The process of claim 9, wherein the phosphate rock is digested by nitric acid, sulfuric acid or a mixture thereof.

11. The process according to claim 1, wherein the phosphoric acid containing composition is an acidic aqueous composition comprising from 25 to 33 wt % phosphoric acid, from 6-21 wt % nitric acid, from 3.5 to 5 wt % calcium and dissolved heavy metals, with wt % based on the total weight of the composition.

12. The process of claim 11, wherein the dissolved heavy metal is cadmium.

13. The process according to claim 1, wherein R in Formula 1 is selected from the group consisting of cyclohexyl, isopropyl, isobutyl, n-propyl, octyl, hexyl, phenylethyl and 2,4,4-trimethylpentyl.

14. The process of claim 13, wherein the heavy metal precipitation agent is sodium diisobutyldithiophosphinate.

15. The process of claim 1, wherein the dissolved heavy metal is cadmium.

\* \* \* \* \*